United States Patent
Peterson

(10) Patent No.: US 7,815,199 B2
(45) Date of Patent: Oct. 19, 2010

(54) SPEED DEPENDENT CONTROL FOR DUAL AIR SPRING CONFIGURATION

(75) Inventor: John Ashley Peterson, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 66 days.

(21) Appl. No.: 12/402,072

(22) Filed: Mar. 11, 2009

(65) Prior Publication Data

US 2010/0230911 A1   Sep. 16, 2010

(51) Int. Cl.
  *B60G 17/02* (2006.01)
(52) U.S. Cl. .............................. 280/5.515; 280/124.116
(58) Field of Classification Search .............. 280/5.513, 280/5.515, 124.16, 5.116, 124.157
  See application file for complete search history.

(56) References Cited

U.S. PATENT DOCUMENTS

| | | | | |
|---|---|---|---|---|
| 4,162,090 A | * | 7/1979 | Schwartz | 280/124.116 |
| 4,506,910 A | * | 3/1985 | Bierens | 280/124.116 |
| 4,555,096 A | * | 11/1985 | Pryor | 267/64.21 |
| 4,634,142 A | * | 1/1987 | Woods et al. | 280/5.503 |
| 5,072,392 A | | 12/1991 | Taniguchi | |
| 5,570,287 A | | 10/1996 | Campbell et al. | |
| 5,606,503 A | | 2/1997 | Shal et al. | |
| 5,765,115 A | | 6/1998 | Ivan | |
| 2005/0173851 A1 | | 8/2005 | Lloyd | |

FOREIGN PATENT DOCUMENTS

GB   244023   12/1925

OTHER PUBLICATIONS

European Search Report dated Jul. 2nd, 2010.

\* cited by examiner

*Primary Examiner*—Paul N Dickson
*Assistant Examiner*—Robert A Coker
(74) *Attorney, Agent, or Firm*—Carlson, Gaskey & Olds

(57) ABSTRACT

An air suspension system is configured to maintain a desired vehicle comfort ride level as a function of vehicle speed. The air suspension system includes a plurality of air spring assemblies that each include a piston airbag and a primary airbag mounted around the piston airbag. A first set of the air spring assemblies is tuned to a first ride rate and a second set of the air spring assemblies is tuned to a second ride rate. Pressure is continuously varied within the first and second sets of air springs to maintain a first predetermined ride rate difference between the first ride rate and the second ride rate under a low vehicle speed condition and to maintain a second predetermined ride rate difference between the first ride rate and the second ride rate under a high vehicle speed condition.

16 Claims, 3 Drawing Sheets

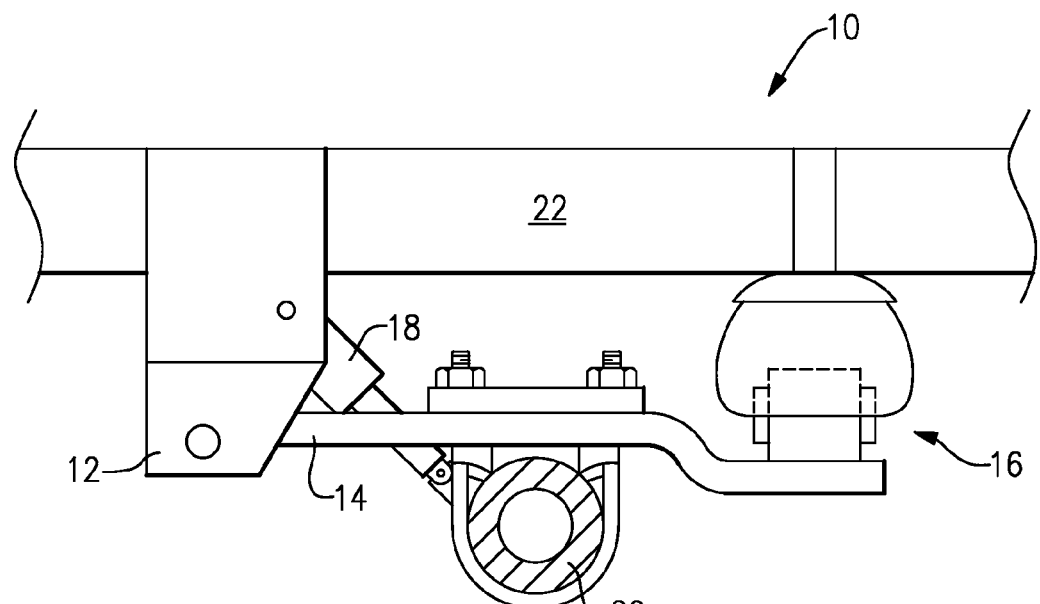
FIG. 1
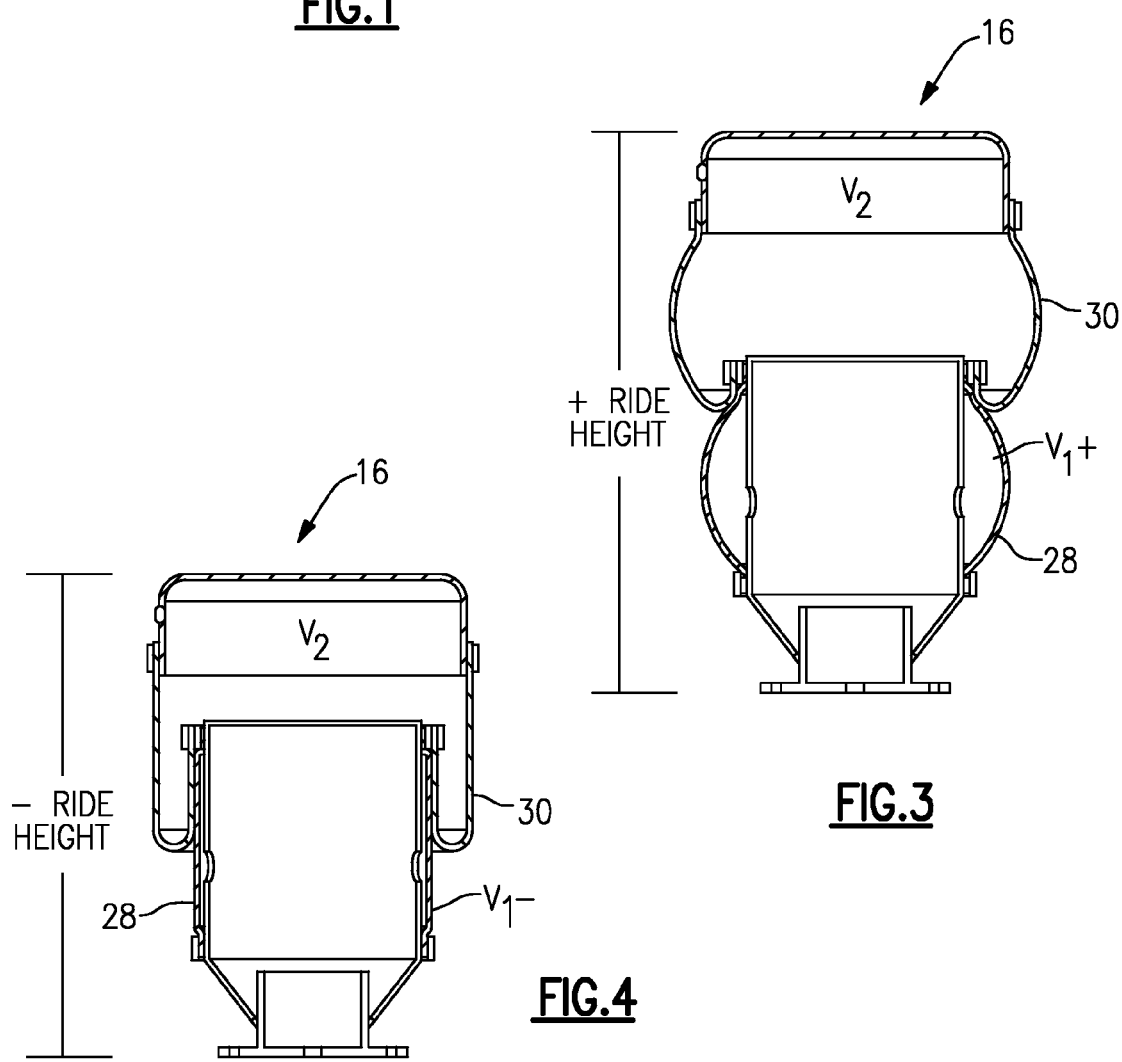
FIG. 3
FIG. 4

US 7,815,199 B2

SPEED DEPENDENT CONTROL FOR DUAL AIR SPRING CONFIGURATION

TECHNICAL FIELD

This invention generally relates to an air suspension system that is configured to maintain a desired vehicle comfort ride level as a function of vehicle speed.

BACKGROUND OF THE INVENTION

Air suspensions utilize air springs to provide desired output characteristics, such as ride comfort and vehicle performance for example. One known active air suspension uses an air spring assembly that includes a primary airbag mounted around a piston airbag such that the piston airbag provides a rolling surface for the primary airbag. A change in piston airbag volume changes an effective piston area of the primary airbag. A relatively small change in the effective piston area provides a change in a spring rate of the air spring assembly. The pressures in the piston airbag and the primary airbag are selectively controlled to provide infinite variation in spring rates without requiring any auxiliary tanks and associated actuators. The smaller volume of the piston airbag relative to the larger volume of the primary airbag permits rapid pressure and volume changes to enable active suspension control.

In order to provide a desired vehicle ride comfort at various speeds, suspension systems have often tuned springs to have a specified ride rate difference between front and rear axles on a vehicle. This ride rate difference is effective for low vehicle speeds; however, at higher vehicle speeds this ride rate difference adversely effects ride comfort. Traditionally, active air suspension systems have made gross discrete changes in suspension spring stiffness through switchable air spring volumes, but this has proven ineffective to maintaining a continuous desired ride comfort level. Thus, there is a need to provide speed dependent variable ride control for an active air suspension that utilizes a variable dual air spring configuration.

SUMMARY OF THE INVENTION

An air suspension system is configured to maintain a desired vehicle comfort ride level as a function of vehicle speed. The air suspension system includes a plurality of variable force and rate dual air spring assemblies. A first set of these air spring assemblies is tuned to a first ride rate and a second set of these air spring assemblies is tuned to a second ride rate. Pressure is continuously varied within the first and second sets of air springs to maintain a first predetermined ride rate difference between the first ride rate and the second ride rate under a first vehicle speed condition and to maintain a second predetermined ride rate difference between the first ride rate and the second ride rate under a second vehicle speed condition different than the first vehicle speed condition.

Each air spring assembly includes a piston airbag and a primary airbag mounted around the piston airbag. In one example, a controller continuously adjusts air pressure within the piston airbags to maintain the desired ride rates at the specified vehicle speed conditions. Further, the controller also continuously adjusts spring force and spring rate of each air spring assembly independently of any other air spring assembly by controlling air flow into and out of each piston airbag and each primary airbag.

In one example, the first vehicle speed condition comprises surface street speeds and the second vehicle speed condition comprises highway speeds.

In one example, the first predetermined ride rate difference comprises a difference within a range of at least ten percent relative to each other and the second predetermined ride rate difference comprises a difference that approaches zero percent difference relative to each other.

These and other features of the present invention can be best understood from the following specification and drawings, the following of which is a brief description.

BRIEF DESCRIPTION OF THE DRAWINGS

FIG. 1 is a general side view of one example of an active air suspension as installed on a vehicle.

FIG. 3 is a sectional view of the air spring in a first position.

FIG. 4 is sectional view of the air spring in a second position.

DETAILED DESCRIPTION OF THE PREFERRED EMBODIMENT

Figure 2:
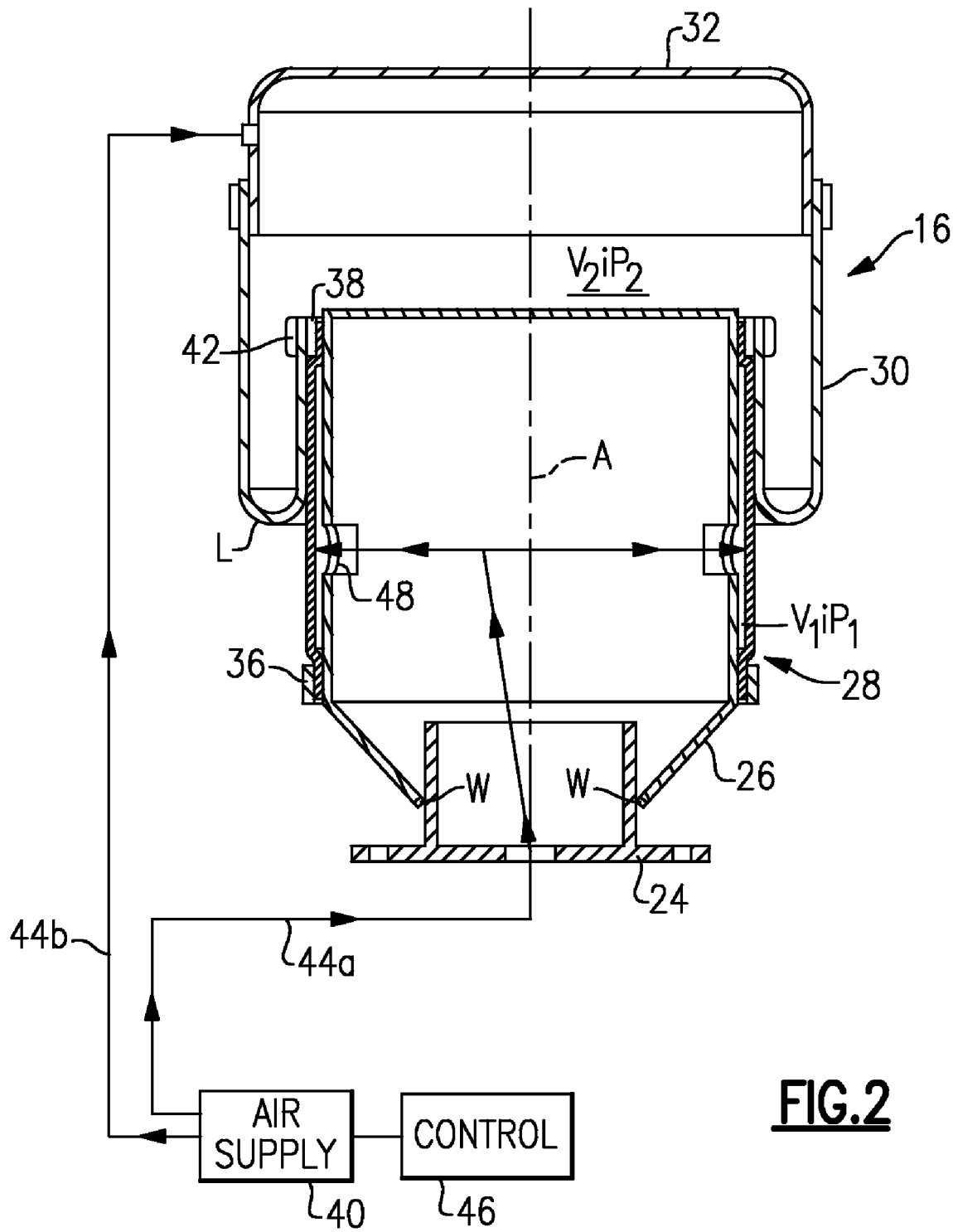
FIG. 2 is a sectional view of an air spring assembly as used in the active air suspension of FIG. 1.

FIG. 1 illustrates an air suspension system 10 for a vehicle. The air suspension system 10 generally includes a bracket 12, a longitudinal member 14, an air spring assembly 16, a damper 18, and an axle assembly 20. The air suspension system 10 is fixed to a frame or chassis of the vehicle (shown schematically at 22). The longitudinal member 14 could comprise a suspension arm, for example, and the axle assembly 20 could comprise any type of axle, such as a drive axle, non-drive axle, trailer axle, etc. The axle assembly 20 extends between laterally spaced wheels (not shown). It should be understood that the air suspension system 10 includes a longitudinal member 14, an air spring assembly 16, and a damper 18 at each lateral end of the axle assembly 20.

Referring to FIG. 2, the air spring assembly 16 is illustrated in cross-section. The air spring assembly 16 is defined along a central vertical axis A and includes a lower mount 24 (illustrated schematically), a piston support 26 attached to the lower mount 24, a piston airbag 28, and a primary airbag 30. An upper mount 32 is attached to the primary airbag 30. The upper 32 and lower 24 mounts provide attachment for the air spring assembly 16 between the longitudinal member 14 and chassis 22 (see FIG. 1).

The piston support 26 is a cylindrical member defined about the axis A. At the lower mount 24 the piston support 26 can be attached to many different structures such as a strut, shock, damper, or other similar mechanism, for example. In one example, the piston support 26 is attached to the lower mount 24 at welds W; however other attachment methods could also be used. The piston support 26 and the lower mount 24 are relatively rigid components.

The piston airbag 28 is a flexile, resilient member and is attached to the piston support 26 through a first band 36 and a second band 38. The first band 36 is secured at a lower end of the piston support 26 and the second band 38 is secured at an upper or opposite end of the piston support 26. While bands are shown, it should be understood that other attachment structures and/or methods could be used to secure the piston airbag 28 to the piston support 26. The piston airbag 28 defines a first volume V1 that is enclosed vertically between the bands 36, 38 and between an inner surface of the piston airbag 28 and an outer surface of the piston support 26.

The primary airbag 30 is mounted to the piston airbag 28 through a third band 42 which is spaced radially outwardly relative to the second band 38 with the primary airbag 30 being located between the second 38 and third 42 bands. In other words, the primary airbag 30 is sandwiched between the third band 42 and the second band 38. The primary airbag 30 defines a second volume V2. It should be understood that while two volumes V1, and V2 are disclosed in the illustrated embodiment, additional volumes could also be utilized within the spring assembly 16 as needed. Further, any of these volumes may be selectively segmented to provide further incremental volume changes.

An air supply system 40 (illustrated schematically in FIG. 2) communicates air independently into the volumes V1, V2 through a first and second supply conduits 44a, 44b respectively in response to a controller 46 (illustrated schematically). The controller 46 is a suspension controller that provides active suspension control methodology. Ports 48 through the piston support 26 supply air into the first volume V1.

The piston airbag 28 operates as a rolloff piston surface for the primary airbag 30. In other words, the primary airbag 30 provides a rolling lobe L over a piston assembly having a variable diameter provided by the variable volume of the piston airbag 28. As the air spring assembly 16 experiences road load inputs, the lobe L of the primary airbag 30 rolls along the outer surface of the piston airbag 28. By changing the volume V1 or pressure P1 within the piston airbag 28 the outer diameter of the piston airbag 28 changes. A change in the piston airbag 28 volume V1 thereby changes the effective piston area of the primary airbag 30. It is also understood that the primary airbag 30 will exert a pressure P2 against the piston airbag 28, tending to reduce the outer diameter of the piston airbag 28 until an equilibrium diameter is reached. Therefore a change in pressure P1 will change the radial spring rate of the piston airbag 28 and change the equilibrium diameter also affecting the primary airbag spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the airbag assembly 16 as volume V1 effectively provides a larger rolloff piston. The opposite results are obtained when the pressure within the piston airbag 28 is reduced as volume V1 respectively decreases (FIG. 4). This reduces the ride height and spring rate.

A relatively small change in volume V1 provides a change in the spring rate of the primary airbag 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

Figure 5:
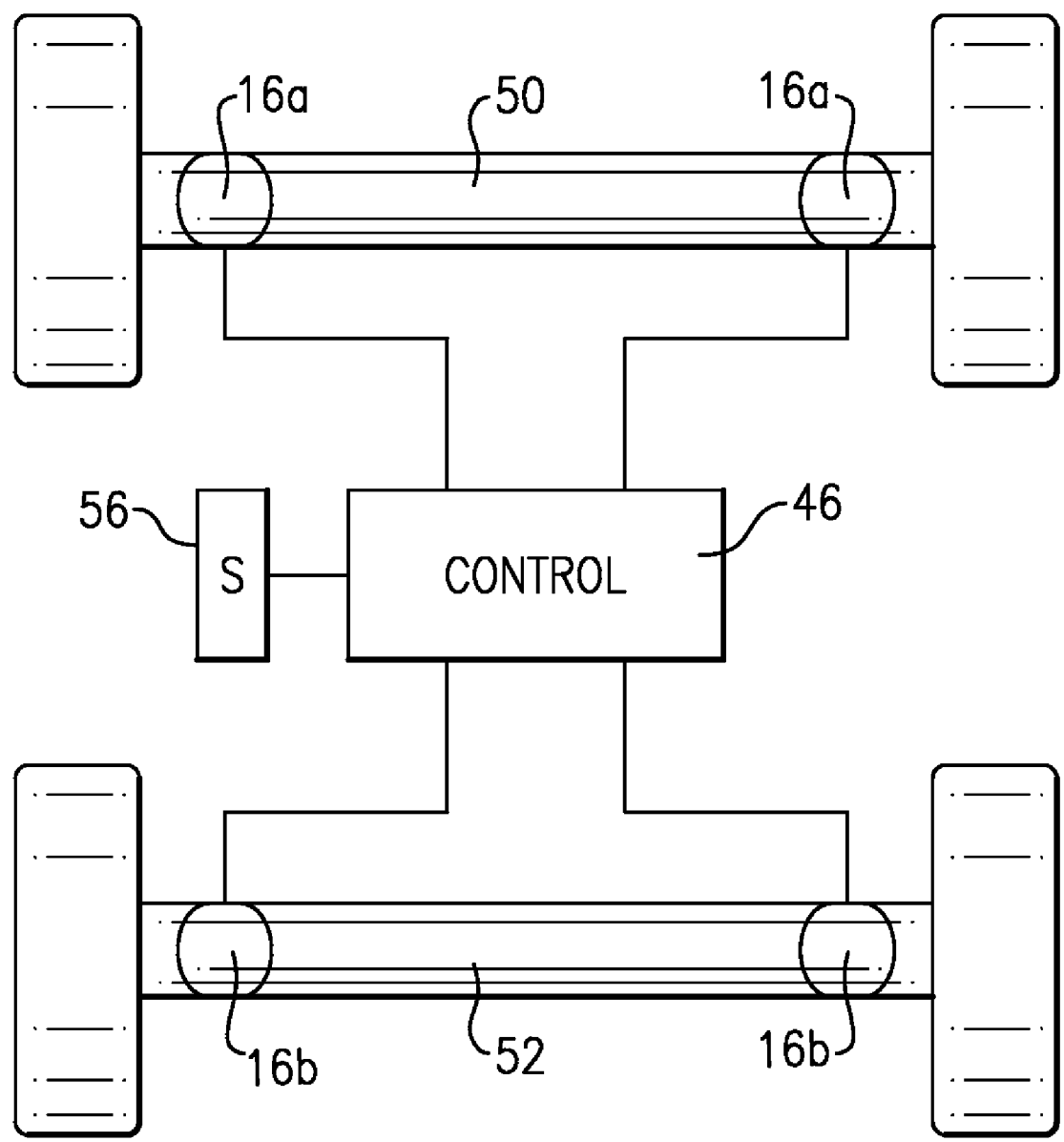
FIG. 5 is a schematic top view of a front set of air springs and a rear set of air springs controlled by a controller to improve ride comfort.

In order to provide a desired vehicle ride comfort at different vehicle speeds, the suspension system 10 actively adjusts air pressure within the air spring assemblies 16. FIG. 5 shows one example where a first set of air spring assemblies 16a are associated with a front axle 50 and a second set of air spring assemblies 16b are associated with a rear axle 52. Each air spring assembly 16a, 16b is configured similar to the air spring assembly 16 shown in FIG. 2.

The controller 46 is configured to maintain a desired vehicle ride comfort level as a function of vehicle speed. The controller 46 continuously monitors and measures vehicle speed 56, i.e. a longitudinal velocity of the vehicle. The controller 46 can estimate vehicle speed 56 from sensed or measured wheel speeds, from a gear speed in a vehicle driveline, or by various other known methods. As vehicle velocity changes, the controller 46 adjusts air pressure in the air spring assemblies 16a, 16b to maintain optimal passenger ride comfort.

In one example, the first set of air spring assemblies 16a is tuned to a first ride rate and the second set of air spring assemblies 16b is tuned to a second ride rate. To maintain a desired vehicle ride comfort level based on vehicle speed, the controller 46 actively varies pressure within the first 16a and second 16b sets of air spring assemblies to maintain a first predetermined ride rate difference between the first ride rate and the second ride rate under a first vehicle speed condition, and to maintain a second predetermined ride rate difference between the first ride rate and the second ride rate under a second vehicle speed condition different than the first vehicle speed condition.

As discussed above, the first set of air spring assemblies 16a are supported by the front axle 50 and the second set of air spring assemblies 16b are supported by the rear axle 52. The air spring assemblies at each axle are designed for a fundamental ride-rate difference that provides the predetermined vehicle ride comfort level. As the vehicle velocity changes, the controller 46 actively varies the ride-rate difference between the front and rear air spring assemblies to continue to provide the predetermined vehicle ride comfort level.

In one example, the first vehicle speed condition comprises a low speed condition that would encompass surface street speeds, and the second vehicle speed condition comprises a high speed condition that would encompass highway speeds. Thus, the first predetermined ride rate difference is set for low speeds and the second predetermined ride rate different is set for high speeds.

In one example, the first predetermined ride rate difference comprises a difference within a range ten to twenty percent relative to each other. In other words, one of the first 16a and second 16b sets of air spring assemblies is tuned to a specified ride rate while the other of the first 16a and second 16b sets of air spring assemblies is tuned to a ride rate that is ten to twenty percent different than the initially specified rate when the vehicle is operating at low speeds. This is just one example of percentage range and other ranges could be used depending upon vehicle characteristics. For example, the difference is a function of vehicle wheelbase. A long wheel base may already have a small difference while a short wheelbase vehicle would have a comparatively large difference.

When the vehicle is operating at high speeds, the second predetermined ride rate comprises a difference that approaches zero. In other words, as the vehicle experiences increased speeds, the controller 46 adjusts the air pressure within the air springs such that the ride rate difference between the first 16a and second 16b sets of air springs approaches zero.

In one example, the first predetermined ride rate is generally maintained at speeds less than fifty miles per hour and the second predetermined ride rate is maintained at speeds greater than fifty miles per hour. However, it should be understood that this is just one example speed and that the system can be configured to adjust between the first and second predetermined ride rates based on different vehicle speeds.

Further, the controller 46 can also be configured to adjust between more than two specified ride rate conditions, or each of the first and second predetermined ride rates can be subdivided into multiple predetermined ride rates between which the controller 46 would continuously adjust air pressure within the air springs.

In one example, the controller 46 continuously adjusts the air pressure within the piston airbag 28 of each air spring assembly 16a, 16b. Due to the smaller volume of the piston airbag 28 relative to the primary airbag 30, the desired ride comfort level can be quickly and easily maintained.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air suspension system comprising:
    a plurality of air spring assemblies, each air spring assembly including a piston airbag and a primary air bag mounted around the piston airbag, and wherein said plurality of air spring assemblies includes at least a first set of air springs tuned to a first ride rate and a second set of air springs tuned to a second ride rate; and
    a controller configured to maintain a desired vehicle ride comfort level based on vehicle speed, wherein said controller actively varies pressure within said first and said second sets of air springs to maintain a first predetermined ride rate difference between said first ride rate and said second ride rate under a first vehicle speed condition and to maintain a second predetermined ride rate difference between said first ride rate and said second ride rate under a second vehicle speed condition different than said first vehicle speed condition.

2. The air suspension system according to claim 1 wherein said controller actively varies spring force and spring rate of each air spring assembly independently of any other air spring assemblies during vehicle operation.

3. The air suspension system according to claim 2 wherein said controller continuously adjusts spring force and spring rate of each of the air spring assemblies by controlling air flow into and out of each piston airbag and each primary airbag.

4. The air suspension system according to claim 1 wherein said first predetermined ride rate difference comprises a difference of at least ten percent relative to each other.

5. The air suspension system according to claim 4 wherein said first predetermined ride rate difference comprises a difference of at least twenty percent relative to each other.

6. The air suspension system according to claim 1 wherein said second ride rate difference comprises a difference that approaches zero percent difference relative to each other.

7. The air suspension system according to claim 1 wherein said first vehicle speed condition comprises a low speed condition and said second vehicle speed condition comprises a high speed condition.

8. The air suspension system according to claim 7 wherein said low speed condition comprises a vehicle speed that is less than or equal to fifty miles per hour, and said high speed condition comprises a vehicle speed that is greater than or equal to fifty miles per hour.

9. The air suspension system according to claim 1 wherein said first predetermined ride rate difference comprises a difference of at least ten percent relative to each other and said second predetermined ride rate difference comprises a difference that approaches zero percent difference relative to each other.

10. The air suspension system according to claim 9 wherein said first vehicle speed condition comprises surface street speeds and said second vehicle speed condition comprises highway speeds.

11. The air suspension system according to claim 1 wherein said controller continuously adjust air pressure in said piston airbags to maintain said first and said second predetermined ride rate differences under said respective first and second vehicle speed conditions.

12. A method of maintaining a desired vehicle ride comfort level with an air suspension system comprising the steps of:
    (a) providing a plurality of air spring assemblies, each air spring assembly including a piston airbag and a primary air bag mounted around the piston airbag;
    (b) tuning a first set of air springs from the plurality of air spring assemblies to a first ride rate;
    (c) tuning a second set of air springs from the plurality of air spring assemblies to a second ride rate; and
    (d) actively varying pressure within the first and the second sets of air springs to maintain a first predetermined ride rate difference between the first ride rate and the second ride rate under a first vehicle speed condition and to maintain a second predetermined ride rate difference between the first ride rate and the second ride rate under a second vehicle speed condition different than the first vehicle speed condition.

13. The method according to claim 12 wherein step (d) includes continuously adjusting air pressure in the piston airbags to maintain the first and the second predetermined ride rate differences under the respective first and second vehicle speed conditions.

14. The method according to claim 12 wherein the first vehicle speed condition comprises surface street speeds and said second vehicle speed condition comprises highway speeds.

15. The method according to claim 14 wherein the first predetermined ride rate difference comprises a difference of at least ten percent relative to each other and the second predetermined ride rate difference comprises a difference that approaches zero percent difference relative to each other.

16. The method according to claim 12 including continuously adjusting spring force and spring rate of each air spring assembly independently of any other air spring assembly by controlling air flow into and out of each piston airbag and each primary airbag.

* * * * *